(No Model.)

H. N. BAKER.
Windmill.

No. 233,392. Patented Oct. 19, 1880.

Witnesses:
T. J. Lacey.
A. B. Brown.

Inventor
Henry N. Baker
Per his Atty J. C. Robie

UNITED STATES PATENT OFFICE.

HENRY N. BAKER, OF BINGHAMTON, NEW YORK.

WINDMILL.

SPECIFICATION forming part of Letters Patent No. 233,392, dated October 19, 1880.

Application filed March 15, 1880. (No model.)

*To all whom it may concern:*

Be it known that I, HENRY N. BAKER, of Binghamton, in the county of Broome and State of New York, have invented certain new and useful Improvements in Windmills, of which the following is a specification, reference being had to the accompanying drawings.

My invention relates to that class of windmills which have wings with angular faces and governor to regulate their movements.

The objects of the improvements are, first, to provide a reliable, efficient, and simple device that may be operative without liability to derangement; second, to facilitate the adjustment of the wings during an increased force of wind by means of a governor which may be worked automatically or by hand.

My invention consists in the construction and arrangement of the oscillating wing-frame and connections, in combination with the peculiar arrangement and operation of the governor or regulator, and the manner of starting and stopping the device, all of which will hereinafter be fully described.

Figure 1:
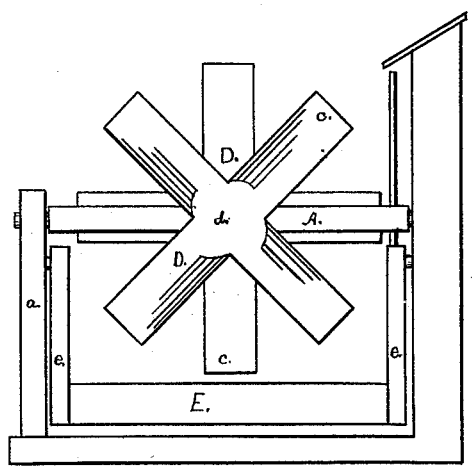
Figure 2:
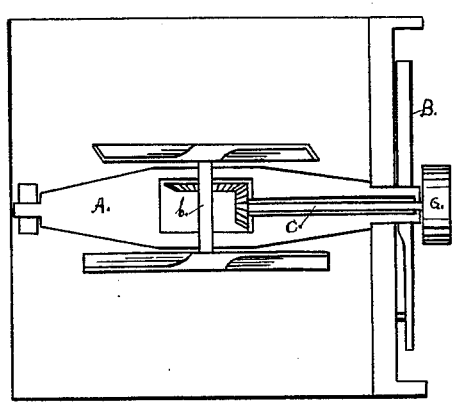
Figure 3:
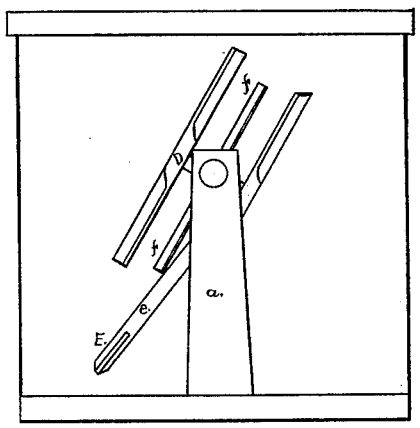
Figure 4:
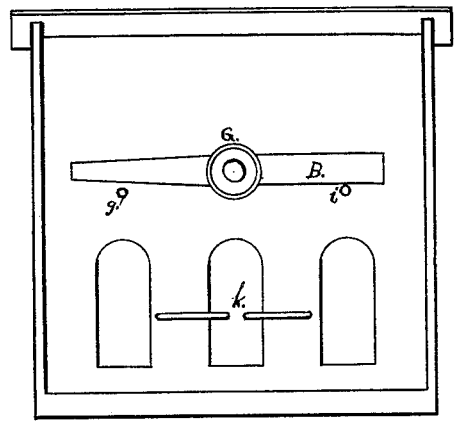

Figure 1 in the accompanying drawings is a side elevation of the windmill in position for operation. Fig. 2 is a plan sectional view, showing the oscillating frame and connections. Fig. 3 is an end view, representing the position of the wings during an increased force of wind. Fig. 4 is a front elevation, showing the manner of starting and stopping the device.

The oscillating frame A is hung on the standard $a$ and a bearing in the side of the building, the journal extending far enough inside for the attachment of the governor-lever B. This journal is hollow and forms a bearing for the driving-shaft C. On the inner end of this shaft is attached a pulley, and to the other a pinion, which forms a bevel-gear with a toothed wheel on the wing-shaft $b$, which has bearings across the center of the oscillating frame A, as shown by Fig. 2 in the drawings.

The wings D are attached to each end of the shaft $b$ on the sides of the frame A, and they are halved and secured together in their centers, their projections $c\ c$ being made to an angle with their hubs $d$, so that the wind impinging on their inclined faces from a side direction rotates them with a force proportionate to its velocity. The wings D are so placed in relation with each other that the action of the wind will not be obstructed by the one on the opposite side.

E is the governor, which adjusts the side movements of the wings to the increased force of the wind, so that they shall have a less effective position for its action. This governor has two arms, $e\ e$, extending at a right angle with the wind-board or wing. These arms are pivoted in their ends directly under the journal-bearings of the frame A, so that the wind-board hangs low enough to clear the ends $c\ c$ of the wings D.

At the end of the frame A are two projecting arms, $f\ f$, one of which engages with the arm $e$ of the governor in its movements by the wind, which inclines the wings to a side direction by an increased velocity, rendering its action on the wings less effective.

B is the governor-lever, which is weighted at one end for the purpose of retracting the wings to their vertical position when the wind diminishes in force. This lever controls the lateral movements of the wings, and may be secured at any desired angle, and by moving it against stops $g$ and $i$ it brings the wings to a working position.

For operating the device the lever B is placed against the stop opposite to the windward side of the device, and, when the wind is in an opposite direction, vice versa; and for stopping it the lever is moved to the stop-catch $k$, which holds it in a vertical position. This brings the wings to a horizontal position over and under the frame A and allows them to feather in a line of the current of the wind.

If required, the base of the device may be made to work on a pivot in the center, which will allow of setting it to any desired quarter.

G is the driving-pulley, and a corresponding one may be attached to the opposite end of the frame by extending the shaft C.

I am aware that prior to my invention wings of windmills have been made to incline to give a less effective force of wind on their action. I therefore do not claim such a combination, broadly; but

What I claim as my invention, and desire to secure by Letters Patent, is—

1. In combination with the wings D, the oscillating frame A, driving-shaft C, working on and in a line with the axis of the frame A, and arms $ff$, as shown and described.

2. In combination with the frame A, the swinging governor E, adjusting-lever B, attached to the journal of frame A, for controlling the side movements of the wings D and starting and stopping the device, shaft C, and stops $g$, $i$, and $k$, all constructed substantially as herein shown and described, for the purpose set forth.

HENRY N. BAKER.

Witnesses:
PERRY P. ROGERS,
JAMES FLYNN.